June 10, 1924.
G. B. MORRIS
ELECTRIC CONTROL SYSTEM
Filed Nov. 23, 1921
1,497,281
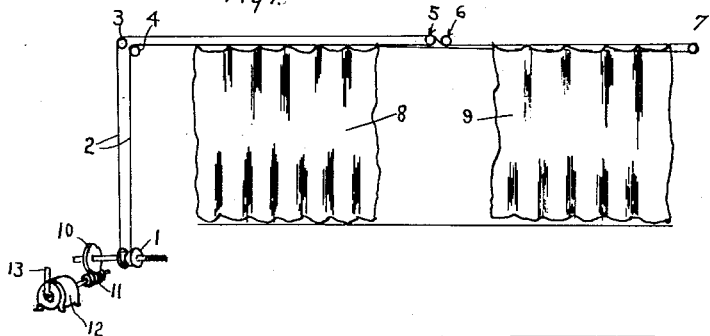
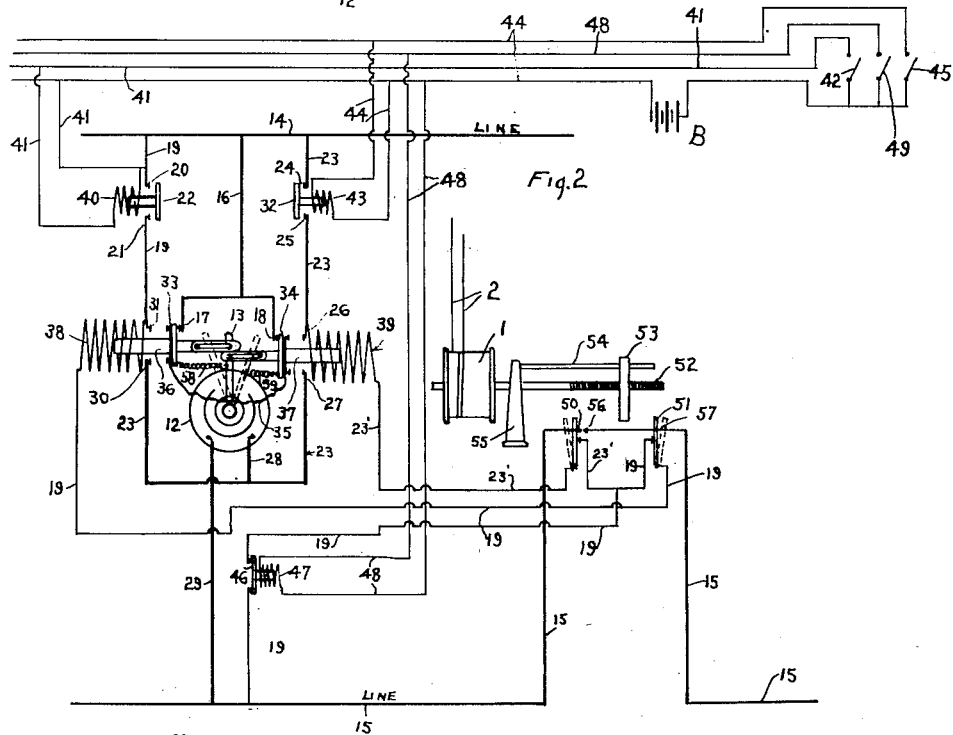
George B Morris INVENTOR.
BY
ATTORNEY.

Patented June 10, 1924.

1,497,281

UNITED STATES PATENT OFFICE.

GEORGE B. MORRIS, OF PASADENA, CALIFORNIA, ASSIGNOR TO EDWIN H. FLAGG SCENIC CO., OF LOS ANGELES, CALIFORNIA.

ELECTRIC CONTROL SYSTEM.

Application filed November 23, 1921. Serial No. 517,266.

*To all whom it may concern:*

Be it known that I, GEORGE B. MORRIS, a citizen of the United States, residing in the city of Pasadena, county of Los Angeles, and State of California, have invented certain new and useful Improvements in Electric Control Systems, of which the following is a specification.

My invention relates to electric control systems, and more particularly to a system of control for controlling a motor from a distance, whereby said motor can be started by the closing of a switch, and can be reversed by the closing of another switch, or it can be stopped by the closing of another switch. My invention is particularly adapted for use in manipulating theater curtains where the curtain is moved in opposite directions and where it is sometimes desirable to immediately change the direction of movement of the curtain without any perceptible stop, or where it is desired to stop the movement of the curtain in any position. Another object of my invention is to provide in connection with such a control system, means whereby the control can be installed in places where low voltage wiring is preferable, thus making it possible to have control switches in low voltage circuits which operate other switches in the higher voltage circuits and which are sufficient to operate the motor.

In my invention I use a motor to drive a drum, or the like, in either direction, and install my control system so as to make possible the full control of said motor from a distance with a minimum of wiring, thus avoiding the expense and inconvenience of installing wiring which is required to be in conduits or other protecting means.

In order to explain my invention, I have shown it on the accompanying drawings as installed in a theater for manipulating the curtains, with a wiring system for controlling the operation of the curtains from the operating room, by simple button switches. In the drawings,—

Figure 1 is a view showing two curtains, with motor driven drum for operating the curtains toward and from each other; and Figure 2 is a diagrammatic view illustrating the operating motor, the drum, and the wiring system and control.

Figure 3 is an enlarged view of the limit control switch mechanism.

Referring more in detail to the drawings, 1, designates a drum, around which is an operating cable, 2, operating over suitable pulleys, 3, 4, 5, 6 and 7, and attached to two curtains, 8 and 9, whereby, when said drum 1, is turned in one direction, said curtains are moved away from each other, and when said drum is turned in the opposite direction, said curtains are moved toward each other. Said drum is driven by means of a worm gear, 10, and worm, 11, which is driven by a motor, 12, controlled as to the direction of operation by means of a control lever 13. These elements are old in the art and need not be further described as to their details.

Referring to Fig. 2, the main line circuit wires are designated 14 and 15, carrying the usual voltage, or 110 volts. From the main line 14 runs a circuit, 16, with two branches to contacts 17 and 18. A circuit 19, with the contacts, 20 and 21, is adapted to be connected by a switch member 22, said switch being operated in a manner hereinafter described. A circuit, 23, from the main line 14, has the contacts, 24 and 25, and also the contacts, 26 and 27, and is connected with the motor, 12, by line 28, with return line, 29, to the main line 15. The line 23 is also extended to contact 30, opposite contact, 31, line 19. Contacts 24 and 25 are adapted to be connected by a switch member 32. Movable switch members, or connecting members, 33 and 34, are connected by a flexible connection, 35, and are mounted, respectively, on the cores, 36 and 37, of solenoids, 38 and 39. The opposite ends of said cores, 36 and 37, are connected by means of slot and pin connections, to the control lever 13 of the motor 12, as clearly indicated.

The switch member 22 is moved by a solenoid 40, connected in circuit 41, from the battery B, with closing switch, 42. The switch member 32 is moved by a solenoid 43, connected in circuit, 44, from battery B, with closing switch, 45. A third switch member, 46, is moved by solenoid, 47, connected in circuit, 48, from battery B, with closing switch 49. A pair of limit cut-out switches, 50 and 51, are mounted near the shaft 52 of the drum 1, said switches 50 and 51 being positioned to be engaged and moved by means of a traveling element, 53, threaded on the shaft 52 of the motor, said traveling element being held and guided by means of a rod, 54, held in a standard 55, as shown.

The solenoid, 38, which operates switch member 33, is in circuit 19, from line 14 to line 15, and including switch 51, and switch 46. Solenoid 39, which operates switch member 34, is in circuit represented by line 23, from main line 14, and line 23' and line 19, to main line 15. Main line 15 is also provided with means for opening the same, as at 56 and 57, controlled by the limit switch members 50 and 51, adapted to be moved by the traveling element 53, when the limit of movement in either direction has been reached, if the motor is not stopped before said limit is reached. The initial movement of either of said switch members 50 or 51, opens circuits 23' or 19, as the case may be, and these circuits, when opened, deenergizes solenoids 39 or 38 and permits the control lever 13 of the motor 12 to be moved to neutral position, as shown in full lines, said lever being moved to its normal position, when released, by springs, 58 or 59.

In Fig. 3 I have shown an enlarged view of the stop mechanism which is operated by the traveling nut or element 53. This traveling element as it reaches the limit of its movement, engages with the switch members, 50 or 51, as the case may be and moves the same. The initial movement breaks the contacts at 60, or 61, as the case may be, in the circuits 23' or 19, thus operating to deenergize electromagnets 39 or 38, as before described. If for any reason the mechanism should continue to run, the further movement of said traveling element, 53, will further move said switch members, 50, or 51, as the case may be, until contact member 62 is pulled from between the contact spring members, 63, in the main line 15, thus interrupting the main line circuit and stopping the motor immediately. The switch members, 50 and 51, are normally held in closing positions by means of springs, 64 and 65, at their hinged ends on base 66. I am aware that various details of construction can be used for controlling the circuits, and also that other details can be changed.

The operation of the system may be briefly described as follows: The three switches 42, 49 and 45, in the battery circuits, 44, 48 and 41, are manipulated to control the electromagnets 40, 47 and 43, in the main circuits 19, 19 and 23, which control the electromagnets 38 and 39, for moving the direction control lever 13 of the motor 12. Through the connections hereinbefore described, the manual operation of these three switches, 42, 49 and 45, controls the operation of said motor, namely the starting, the stopping, and the reversing of its direction. These can be operated at any time and will quickly cause the action for which each has control connection. It is not necessary that the motor shall continue in one direction any determined length of time, for it can be reversed at any time, started at any time in either direction, or stopped at will by the simple manipulation of the three switches 42, 49 and 45.

I claim:

1. An electric control system comprising in combination with a motor having a direction control lever, electromagnets having armatures connected with said lever and adapted to move the same in opposite directions, a main circuit for electric energy for energizing said electromagnets, switches controlled by said armatures for controlling the circuits which include the electromagnets, other switches in said circuit, a battery with circuits for operating said other switches, and three switches for manual operation, said switches being operatively connected with said battery circuits for causing, respectively, the starting, the stopping and the reversing of said motor, substantially as shown and described.

2. In an electric control, in combination, a motor having a control lever, electromagnets for operating said control lever, main circuit connections to said electromagnets, switches for controlling said main circuit, electrically operated switches for making and breaking said main circuit, a battery with circuits for operating said electrically operated switches, three manually operable switches in said battery circuits, said manually operable switches being adapted to control, respectively, the starting, the stopping and the reversing said motor through its control lever, said manually operable switches being operable at any time whether the motor is running or not.

3. In combination with a motor having a direction control lever, a main circuit and electromagnets for operating said control lever, switches in said circuit, a battery, circuits from said battery for operating said switches, manually operable switches in said battery circuits operable independently to control, respectively, the starting, the stopping and the reversing of said motor, substantially as described.

4. In a control system for motors, in combination, a motor having a direction control lever, electromagnets for moving said lever in opposite directions, a main circuit including said electromagnets, switches in said main circuit controlled by said electromagnets, other switches in said main circuit connections to said electromagnets, said other switches being adapted to be operated by other electromagnets, a battery having circuits to said other electromagnets, manually operable switches in said battery circuits, said switches being connected to control the operation of the electromagnets in the battery circuits, which control the main circuits, whereby said manually operable switches are operable independently of each other to control, respectively, the starting, the stopping and the reversing of said motor, and a limit control switch with means for automatically operating the same at a predetermined period of operation, substantially as described.

Signed at Los Angeles, Los Angeles County, California, this 10th day of November, 1921.

GEORGE B. MORRIS.

Witnesses:
W. R. LITZENBERG,
D. O. FAWCETT.